United States Patent
Takahashi et al.

(10) Patent No.: US 6,288,195 B1
(45) Date of Patent: Sep. 11, 2001

(54) PREPARATION OF ORGANOPOLYSILOXANE GUM

(75) Inventors: Masaharu Takahashi; Yutaka Hagiwara, both of Annaka; Minoru Igarashi, Usui-gun; Kenji Tawara; Yoshio Tomizawa, both of Annaka, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/453,465

(22) Filed: Dec. 2, 1999

(30) Foreign Application Priority Data

Dec. 2, 1998 (JP) .................................................. 10-342826

(51) Int. Cl.$^7$ .................................................. C08G 77/08
(52) U.S. Cl. .............................. 528/12; 528/23; 528/21; 528/37; 556/460
(58) Field of Search .................. 528/12, 23, 21, 528/37; 556/460

(56) References Cited

U.S. PATENT DOCUMENTS

| 3,937,684 | * | 2/1976 | Razzano . |
| 3,978,104 | * | 8/1976 | Razzano . |
| 4,272,624 | * | 6/1981 | Razzano . |
| 4,341,888 | * | 7/1982 | Razzano . |
| 4,395,527 | * | 7/1983 | Berger . |
| 4,439,592 |   | 3/1984 | Mass et al. . |
| 4,563,513 |   | 1/1986 | Inomata . |
| 4,739,026 | * | 4/1988 | Riederer et al. . |

FOREIGN PATENT DOCUMENTS

| 58-69228 | 4/1983 | (JP) . |
| 60-49033 | 3/1985 | (JP) . |

* cited by examiner

*Primary Examiner*—Robert Dawson
*Assistant Examiner*—Kuo-Liang Peng
(74) *Attorney, Agent, or Firm*—Millen, White, Zelano & Branigan, P.C.

(57) ABSTRACT

An organopolysiloxane gum is prepared by polymerizing a cyclic organopolysiloxane with a low molecular weight linear organopolysiloxane end-blocked with a triorganosilyl group in the presence of a thermally decomposable catalyst. After the polymerization reaction, the catalyst is deactivated by heating the reaction product under a subatmospheric pressure of typically up to 500 mmHg.

20 Claims, No Drawings

PREPARATION OF ORGANOPOLYSILOXANE GUM

This invention relates to a method for preparing a organopolysiloxane gum which has a minimized content of hydroxyl in the terminal unit so that the gum is suitable in various silicone rubber compositions.

BACKGROUND OF THE INVENTION

As is well known in the art, organopolysiloxane polymers are prepared, for example, by polymerizing a cyclic organosiloxane in the presence of an alkaline catalyst, optionally neutralizing the catalyst for deactivation, and distilling off low volatiles from the reaction product. The degree of polymerization of such a polymer is controlled by the amount of a low molecular weight organopolysiloxane serving as a terminal stopper. Also the terminal unit structure of the resulting organopolysiloxane depends on the structure of the terminal stopper.

However, the above-described method for preparing organopolysiloxane has the drawback that a trace amount of water in the reactant can also function as the terminal stopper. The resulting organopolysiloxane has hydroxyl groups introduced into the terminal unit, departing from the desired terminal unit. When such a high molecular weight organopolysiloxane gum having terminal hydroxyl groups is mixed with a reinforcing agent such as silica to formulate a silicone rubber compound, the compound gives rise to a crepe hardening phenomenon with the lapse of time because of the interaction between hydroxyl groups at the end of organopolysiloxane gum and hydroxyl groups on silica surface. Prior to use, the silicone rubber compound having undergone crepe hardening must be restored to the initial state by applying strong shear forces in a twin-roll mill or another kneader.

In the application where organopolysiloxane gum is used as a base component of a silicone rubber compound, it is desired to design the organopolysiloxane gum such that its terminal unit consists of a triorganosilyl group. Nevertheless, in the currently available gums, hydroxyl groups are introduced in the terminal unit owing to incidental factors as mentioned above. For the preparation of organopolysiloxane gum, it was needed to reduce the content of hydroxyl groups.

In this regard, the conventional method for preparing organopolysiloxane gum is generally preceded by a pretreatment for removing a trace amount of water from the starting reactants such as a cyclic organopolysiloxane and a low molecular weight, linear organopolysiloxane as the terminal stopper. A typical pretreatment is by blowing an inert gas such as nitrogen into the reactants or drying the reactants in the presence of a desiccant such as silica gel or molecular sieve. However, such pretreatment adds to the number of steps and renders the overall process complicated.

One known means for reducing the influence of water in the reactants is disclosed in JP-A 58-69228 corresponding to U.S. Pat. No. 4,439,592 wherein part of cyclic organopolysiloxane is distilled off in the presence of a polymerization catalyst and at a temperature which is at least 10° C. lower than the polymerization starting temperature. This method is also cumbersome because the complex pretreatment of the reactant is necessary.

Another technique of reducing hydroxyl groups in organopolysiloxane terminal units is by adding a triorganohalosilane and a hexaorganodisilazane for neutralizing the alkali catalyst as disclosed in JP-A 60-49033 corresponding to U.S. Pat. No. 4,563,513. This technique is successful in reducing hydroxyl groups, but raises the problem of metal equipment corrosion due to the use of halosilane.

Therefore, for the preparation of organopolysiloxane gum (or organopolysiloxane having a high degree of polymerization), it is desired to have a technique capable of effectively reducing the content of hydroxyl groups in the terminal unit.

SUMMARY OF THE INVENTION

An object of the invention is to provide a novel and improved method for preparing an organopolysiloxane gum having a minimized content of hydroxyl groups in the terminal unit and of consistent quality in a simple and efficient manner.

The invention is directed to a method for preparing an organopolysiloxane gum by polymerizing a cyclic organopolysiloxane along with a low molecular weight, linear organopolysiloxane end-blocked with a triorganosilyl group in the presence of a polymerization catalyst of thermal decomposition type. The polymerization reaction step is followed by the step of heating the reaction product for decomposing or deactivating the polymerization catalyst of thermal decomposition type. Quite unexpectedly, by effecting the heating step under subatmospheric pressure, preferably 500 mmHg or lower, an organopolysiloxane gum substantially free of hydroxyl groups in the terminal unit can be prepared in a simple manner without a need for pretreatment and in an industrially advantageous manner without concern about equipment corrosion. The organopolysiloxane gum obtained by this method does not invite a crepe hardening phenomenon when it is blended with a reinforcing agent such as silica to formulate a silicone rubber composition. The gum is useful as the base component in a variety of silicone rubber compositions.

Accordingly the invention provides a method for preparing an organopolysiloxane gum comprising the steps of polymerizing a cyclic organopolysiloxane with a low molecular weight, linear organopolysiloxane end-blocked with a triorganosilyl group in the presence of a polymerization catalyst of thermal decomposition type, and heating the reaction product under subatmospheric pressure for deactivating the catalyst.

DESCRIPTION OF THE PREFERRED EMBODIMENTS

According to the invention, a cyclic organopolysiloxane is polymerized together with a low molecular weight, linear organopolysiloxane end-blocked with a triorganosilyl group in the presence of a polymerization catalyst of thermal decomposition type to produce a high molecular weight organopolysiloxane gum.

Any well-known compounds may be used as the reactants. The preferred cyclic organopolysiloxane used herein is of the following formula (1).

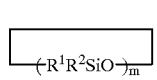

(1)

Herein, $R^1$ and $R^2$ are substituted or unsubstituted monovalent hydrocarbon groups and may be identical or different, and m is an integer of at least 3.

$R^1$ and $R^2$ are preferably substituted or unsubstituted monovalent hydrocarbon groups of 1 to 12 carbon atoms and especially 1 to 8 carbon atoms, for example, alkyl groups such as methyl, ethyl and propyl, alkenyl groups such as vinyl and allyl, aryl groups such as phenyl and tolyl, aralkyl groups such as phenylethyl, alkaryl groups, and substituted ones of these groups in which some or all of the hydrogen atoms are replaced by halogen atoms, cyano and other groups, such as chloromethyl, trifluoropropyl, cyanoethyl, and α-cyanophenylethyl. Preferably $R^1$ and $R^2$ are methyl, phenyl, vinyl or trifluoropropyl groups. Letter m is an integer of at least 3, preferably from 3 to 8, and most preferably equal to 4.

Illustrative examples of the cyclic organopolysiloxane of formula (1) include cyclized dimethylsiloxanes such as hexamethylcyclotrisiloxane and octamethylcyclotetrasiloxane, cyclized methylvinylsiloxanes such as tetramethyltetravinylcyclotetrasiloxane, cyclized diphenylsiloxanes such as octaphenylcyclotetrasiloxane, and cyclized methyltrifluoropropylsiloxanes such as trimethyltrifluoropropylcyclotrisiloxane. Of these, cyclized dimethylsiloxanes such as octamethylcyclotetrasiloxane are preferred because of the availability of starting reactants from which they are prepared. The use of cyclized dimethylsiloxanes in combination with cyclized methylvinylsiloxanes is also preferred from the standpoint of introducing alkenyl groups serving as the crosslinking site. These cyclic siloxanes may be used alone or in admixture of two or more. Preferred is a mixture of cyclic siloxanes containing at least 40%, and especially at least 60% of a cyclic compound wherein m=4.

These cyclic organosiloxanes can be prepared by well-known methods. For example, dimethyldichlorosilane is hydrolyzed to give a mixture of cyclized dimethylsiloxanes. By optional distillation, a simple substance can be isolated.

The low molecular weight, linear organopolysiloxane serves as a terminal stopper for stopping polymerization reaction for adjusting the weight average molecular weight of the resulting organopolysiloxane gum. Well-known chain stoppers including vinyl chain stoppers and trialkylsiloxy chain stoppers such as methyl chain stoppers are useful. Illustrative terminal stoppers are of the following formula (2).

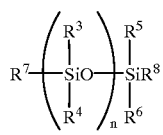

(2)

Herein, $R^3$ to $R^8$ are substituted or unsubstituted monovalent hydrocarbon groups and may be identical or different. The monovalent hydrocarbon groups represented by $R^3$ to $R^8$ are preferably those having the same number of carbon atoms as $R^1$ and $R^2$ in formula (1), with illustrative examples thereof being the same as listed above. In particular, $R^7$ and $R^8$ are preferably methyl or vinyl. The letter n is an integer of 1 to 200, preferably 10 to 100, and more preferably 20 to 80.

The terminal stoppers may be used alone or in admixture of two or more and selected in accordance with the end use of the final product. Of the foregoing stoppers, trialkylsiloxy chain stoppers such as methyl chain stoppers and alkenyl group-containing alkylsiloxy chain stoppers such as vinyl chain stoppers are preferably used.

The amount of the low molecular weight, linear organopolysiloxane or terminal stopper used is preferably about 0.0001 to 10 parts, more preferably about 0.0001 to 5 parts by weight per 100 parts by weight of the cyclic organopolysiloxane of formula (1).

The polymerization catalysts of thermal decomposition type (i.e., thermally decomposable catalysts) are, for example, quaternary phosphonium hydroxides and ammonium compounds, and preferably phosphonium-containing organopolysiloxanes and ammonium-containing organopolysiloxanes. The phosphonium-containing organopolysiloxanes can be prepared by reacting quaternary phosphonium hydroxides such as tetra-n-butylphosphonium hydroxide, tetraphenylphosphonium hydroxide, and tetramethylphosphonium hydroxide with hexamethylcyclotrisiloxane. More specifically, tetra-n-butylphosphonium hydroxide and hexamethylcyclotrisiloxane are mixed in a weight ratio of 1:10 and reacted at a temperature of 40 to 45° C. and a pressure of 30 mmHg for about 10 to 20 hours. The reaction mixture is fully dehydrated until it becomes transparent. Reaction is further continued under a pressure of 20 mmHg for about 2 hours.

Similarly, the ammonium-containing organopolysiloxanes can be prepared by reacting quaternary ammonium hydroxides such as tetramethylammonium hydroxide and tetraphenylammonium hydroxide with hexamethylcyclotrisiloxane. More specifically, in one preferred method, quaternary ammonium hydroxide and hexamethylcyclotrisiloxane are mixed in a weight ratio from 1:100 to 1:5 and reacted at a temperature of 40 to 60° C. and a pressure of 1 to 200 mmHg for about 1 to 10 hours.

The polymerization catalyst of thermal decomposition type is preferably used in an amount of 1 to 1,000 parts, especially 10 to 500 parts by weight per million parts by weight of the cyclic organopolysiloxane and the low molecular weight, linear, triorganosilyl-terminated organopolysiloxane combined. Less than 1 ppm of the catalyst may be insufficient to promote polymerization. More than 1,000 ppm of the catalyst can probably cause difficult removal of the residual compounds or adversely affect the appearance, odor, heat resistance and crosslinking characteristics of the resulting siloxane gum.

For the polymerization or equilibration reaction using the above-described reactants, a conventional set of temperature and time, for example, about 80 to 130° C. and about ½ to 2 hours may be employed.

After the completion of polymerization reaction, the residual polymerization catalyst of thermal decomposition type in the reaction mixture is deactivated by heat decomposition. An exemplary set of deactivating conditions includes a temperature of 130 to 200° C., preferably 140 to 180° C. and a time of ½ to 2 hours. According to the invention, the step of heating the polymerization catalyst for deactivation is carried out under subatmospheric pressure.

As opposed to the conventional step of thermally deactivating the polymerization catalyst under atmospheric pressure or slightly higher pressure, the present invention carries out the thermal deactivation step under a reduced pressure below atmospheric pressure for thereby effectively accomplishing the deactivation of the polymerization catalyst and simultaneously removing the water content from the reaction system. The subatmospheric pressure is below atmospheric pressure, although the preferred vacuum is 500 mmHg or lower and more preferably 100 mmHg or lower. If the pressure during the heating step is at or above atmospheric pressure, the water content cannot be fully removed, which allows for formation of hydroxyl groups in the terminal units, failing to achieve the objects of the invention. If the polymerization step is carried out under subatmospheric pressure, but not followed by the heating step, it is impossible to remove hydroxyl groups which can be introduced into the terminal unit as a result of deactivation of the polymerization catalyst of thermal decomposition type, failing to achieve the objects of the invention.

The thus obtained organopolysiloxane gum is ready for use. However, a common practice is to remove the low volatiles (including low molecular weight siloxanes and decomposed products of the catalyst) remaining in the organopolysiloxane gum before the gum is used. That is, it is recommended to remove, after the deactivation of the polymerization catalyst of thermal decomposition type, the cyclopolysloxanes and volatile components remaining in the polymerization reaction product as polymerization residues.

According to the method of the invention, there is obtained an organopolysiloxane gum having an average degree of polymerization of at least 3,000 and especially at least 4,000. The upper limit of the average degree of polymerization is not critical although it is usually 30,000 or less.

The organopolysiloxane gum thus obtained has terminal units substantially all of which are blocked with triorganosilyl groups originating from triorganosilyl groups at the ends of the low molecular weight, linear organopolysiloxane. That is, the gum has a minimized terminal hydroxyl content. The gum also has a relative viscosity ratio of up to 1.10, and especially up to 1.05, which is defined later.

EXAMPLE

Examples of the invention are given below by way of illustration and not by way of limitation.

Example 1

A 4-liter stainless steel reactor equipped with an agitator including a blade and a motor of a sufficient torque to agitate a high viscosity fluid was charged with 1,800 g of octamethylcyclotetrasiloxane and 9.6 g of a vinyldimethylsilyl-terminated polydimethylsiloxane having a viscosity of 60 centistokes at 25° C. and slowly heated to 110° C. over about one hour. The water content in the reactants was about 120 ppm. After the temperature reached 110° C., 3 g of dimethylpolysiloxanate containing 10% of tetra-n-butylphosphonium hydroxide was added. Polymerization reaction was effected while maintaining the reactor interior at atmospheric pressure and a temperature of 110° C. After 30 minutes, the contents were sampled out for analysis, finding that the product had a fully high molecular weight. After the pressure within the reactor was reduced to 200 mmHg, the reactor was heated to a higher temperature of 150 to 180° C. and kept at the temperature for 2 hours for thermally decomposing the tetra-n-butylphosphonium hydroxide. Thereafter, the pressure within the reactor was slowly lowered to 5 mmHg or below to distill off low volatiles over about 2 hours. The thus obtained organopolysiloxane was a colorless clear gum having a number average molecular weight of 500,000 and an average degree of polymerization of 6,500.

Next, 10 g of the organopolysiloxane gum was dissolved in 90 g of toluene. To this toluene solution were added 0.5 g of tetramethoxysilane and several droplets of tetrapropyl titanate. The viscosity of this solution was measured at the initial and after one hour, and the viscosity after 1 hour was divided by the initial viscosity to give a relative viscosity ratio of 1.02. The relative viscosity ratio approximate to 1 means that because of the substantial absence of hydroxyl groups in the organopolysiloxane gum, little condensation reaction took place between methoxy groups on tetramethoxysilane and hydroxyl groups, resulting in little viscosity change.

Comparative Example 1

A reactor was charged with the same amounts of octamethylcyclotetrasiloxane and vinyldimethylsilyl-terminated polydimethylsiloxane as in Example 1. The reactor was heated to a temperature of 110° C. in a nitrogen stream. The reactants were dried by continuing nitrogen flow for one hour. The water content in the reactants was about 20 ppm. Thereafter, the same amount of the dimethylpolysiloxanate containing 10% tetra-n-butylphosphonium hydroxide as in Example 1 was added. A series of steps from polymerization reaction to thermal decomposition of tetra-n-butylphosphonium hydroxide were carried out as in Example 1 except that the steps were under atmospheric pressure. An organopolysiloxane gum was prepared in this way.

The organopolysiloxane gum had a number average molecular weight of 320,000 and an average degree of polymerization of 4,500. Viscosity measurement was performed as in Example 1, finding a relative viscosity ratio of 1.27. The relative viscosity ratio of 1.27 suggests that although the reactants were previously dried, the water content in the reactants was yet incorporated into the organopolysiloxane at its ends to form hydroxyl groups.

Example 2

A reactor was charged with the same amounts of octamethylcyclotetrasiloxane and vinyldimethylsilyl-terminated polydimethylsiloxane as in Example 1. The reactor was heated to a temperature of 110° C. over about one hour. The water content in the reactants was about 130 ppm. After the temperature reached 110° C., 3 g of dimethylpolysiloxanate containing 10% tetra-n-butylphosphonium hydroxide was added. With the reactor interior kept at atmospheric pressure and 110° C., polymerization reaction was effected. The subsequent steps were as in Example 1 except that the reactor interior was kept at a reduced pressure of 50 mmHg and a temperature of 150 to 180° C. An organopolysiloxane gum was prepared in this way.

The organopolysiloxane gum had a number average molecular weight of 520,000 and an average degree of polymerization of 6,700. Viscosity measurement was performed as in Example 1, finding a relative viscosity ratio of 1.00.

The results of Examples 1 and 2 and Comparative Example 1 are shown in Table 1.

TABLE 1

| Reactants | E1 | CE1 | E2 |
|---|---|---|---|
| Octamethylcyclotetrasiloxane | 1800 g | 1800 g | 1800 g |
| Vinyldimethylsilyl-terminated polydimethylsiloxane | 9.6 g | 9.6 g | 9.6 g |
| 10% tetra-n-butylphosphonium hydroxide-containing dimethylpolysiloxanate | 3 g | 3 g | 3 g |
| Reactant drying step (nitrogen flow) | not dried | dried | not dried |
| Water content in reactants | 120 ppm | 20 ppm | 130 ppm |
| Pressure during polymerization | atmospheric | atmospheric | atmospheric |
| Pressure during deactivation | 200 mmHg | atmospheric | 50 mmHg |
| Organopolysiloxane gum | | | |
| Number average molecular weight | 500,000 | 320,000 | 520,000 |

TABLE 1-continued

| Reactants | E1 | CE1 | E2 |
|---|---|---|---|
| Average degree of polymerization | 6,500 | 4,500 | 6,700 |
| Relative viscosity ratio | 1.02 | 1.27 | 1.00 |

As seen from Table 1, the organopolysiloxane gums of Examples 1 and 2 prepared by the inventive method have a lower relative viscosity ratio than that of Comparative Example 1, specifically a relative viscosity ratio of approximately 1. It was confirmed that an organopolysiloxane gum having the terminal unit with a minimized hydroxyl content is obtained in an efficient manner without a need for pretreatment of reactants.

There has been described a method for preparing an organopolysiloxane gum wherein the formation of hydroxyl groups in the terminal unit of organopolysiloxane gum can be dramatically controlled by simply effecting catalyst deactivation under reduced pressure without a need for complicated pretreatment such as drying of reactants and without concern about equipment corrosion. When the organopolysiloxane gum is blended with a reinforcing agent such as silica to formulate a silicone rubber composition, the composition is devoid of a crepe hardening phenomenon. The method is successful in producing an organopolysiloxane gum of quality in an industrially advantageous manner.

Japanese Patent Application No. 10-342826 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an organopolysiloxane gum comprising the steps of:
   polymerizing a cyclic organopolysiloxane with a low molecular weight, linear organopolysiloxane endblocked with a triorganosilyl group in the presence of a polymerization catalyst of thermal decomposition type, and
   heating the reaction product under subatmospheric pressure for deactivating the catalyst.

2. The method of claim 1 wherein the polymerization catalyst of thermal decomposition type is a phosphonium-containing organopolysiloxane or an ammonium-containing organopolysiloxane or both.

3. The method of claim 1 wherein the subatmospheric pressure is up to 500 mmHg.

4. The method of claim 3 wherein the subatmospheric pressure is up to 100 mmHg.

5. The method of claim 1 wherein the low molecular weight, linear organopolysiloxane is used in an amount of about 0.0001 to 10 parts by weight per 100 parts by weight of the cyclic organopolysiloxane of formula (1),

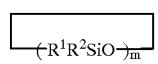

wherein, $R^1$ and $R^2$ are substituted or unsubstituted monovalent hydrocarbon groups and may be identical or different, and m is an integer of at least 3.

6. The method of claim 1 wherein the polymerization catalyst of thermal decomposition type is used in an amount of 1 to 1,000 parts by weight per million parts by weight of the cyclic organopolysiloxane and the low molecular weight, linear organopolysiloxane combined.

7. The method of claim 1 wherein the residual polymerization catalyst of thermal decomposition type is deactivated at a termprature of 130 to 200° C.

8. The method of claim 1, wherein the cyclic organopolysiloxane is a compound of formula (1)

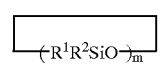

(1)

wherein $R^1$ and $R^2$ are independently substituted or unsubstituted monovalent hydrocarbon groups, and m is an integer of at least 3.

9. The method of claim 8, wherein $R^1$ and $R^2$ have 1 to 12 carbon atoms, and are alkyl, alkenyl, aryl or aralkyl groups.

10. The method of claim 8, wherein $R^1$ and $R^2$ are methyl, ethyl, propyl, vinyl, allyl, phenyl, tolyl, or phenylethyl.

11. The method of claim 8, wherein $R^1$ and $R^2$ are substituted so that some or all of the hydrogen atoms are replaced by halogen atoms, cyano, chloromethyl, trifluoropropyl, cyanoethyl, or a-cyanophenylethyl.

12. The method of claim 8, wherein $R^1$ and $R^2$ are methyl, phenyl, vinyl or trifluorpropyl groups.

13. The method of claim 8, wherein m is an integer of 3 to 8.

14. The method of claim 8, wherein m is equal to 4.

15. The method of claim 1, wherein the triorganosilyl group is a compound of formula (2)

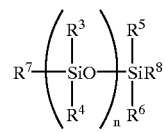

(2)

wherein $R^3$ to $R^8$ are each independently substituted or unsubstituted monovalent hydrocarbon groups, and n is an integer of 1 to 200.

16. The method of claim 15, wherein $R^3$ to $R^8$ have 1 to 10 carbon atoms and are alkyl, alkenyl, aryl or aralkyl, an n is an integer of 10 to 100.

17. The method of claim 1, wherein the low molecular weight, linear organopolysiloxane is used in an amount of about 0.0001 to 10 parts by weight per 100 parts by weight of the cyclic organopolysilixane.

18. The method of claim 1, wherein the low molecular weight, linear organopolysiloxane is used in an amount of about 0.0001 to 5 parts by weight per 100 parts by weight of the cyclic organopolysiloxane.

19. The method of claim 1, wherein the polymerization catalyst of thermal decomposition type is used in an amount of 10 to 500 parts by weight per million parts by weight of the cyclic organopolysiloxane and the low molecular weight, linear organopolysiloxane combined.

20. The method of claim 1, wherein the residual polymerization catalyst of thermal decomposition type is deactivated at a temperature of 140 to 180° C and a time of 1/2 to 2 hours.

* * * * *